(12) United States Patent
Filmer et al.

(10) Patent No.: US 12,163,205 B2
(45) Date of Patent: Dec. 10, 2024

(54) RECOVERY OF PGMS AND CHROMITE FROM MIXED PGM/CR ORES

(71) Applicant: ANGLO AMERICAN TECHNICAL & SUSTAINABILITY SERVICES LTD, London (GB)

(72) Inventors: Anthony Owen Filmer, Kangaroo Point (AU); Daniel John Alexander, St Albans (GB)

(73) Assignee: ANGLO AMERICAN TECHNICAL & SUSTAINABILITY SERVICES LTD, London (GB)

( * ) Notice: Subject to any disclaimer, the term of this patent is extended or adjusted under 35 U.S.C. 154(b) by 553 days.

(21) Appl. No.: 17/441,160

(22) PCT Filed: Mar. 20, 2020

(86) PCT No.: PCT/IB2020/052575
§ 371 (c)(1),
(2) Date: Sep. 20, 2021

(87) PCT Pub. No.: WO2020/188527
PCT Pub. Date: Sep. 24, 2020

(65) Prior Publication Data
US 2022/0162724 A1     May 26, 2022

Related U.S. Application Data

(60) Provisional application No. 62/821,463, filed on Mar. 21, 2019.

(51) Int. Cl.
*C22B 3/44*     (2006.01)
*B03D 1/02*     (2006.01)
(Continued)

(52) U.S. Cl.
CPC ............... *C22B 3/44* (2013.01); *B03D 1/02* (2013.01); *B07B 13/04* (2013.01); *C22B 11/042* (2013.01);
(Continued)

(58) Field of Classification Search
CPC ........... C22B 3/44; C22B 11/042; B03D 1/02; B03D 2201/04; B07B 13/04
(Continued)

(56) References Cited

U.S. PATENT DOCUMENTS 5,034,055 A * 7/1991 Rowson .................. C22B 11/04
                                                   75/744
5,238,662 A * 8/1993 Dubrovsky .............. C01G 1/06
                                                   75/637
(Continued)

OTHER PUBLICATIONS

Written Opinion for PCT/IB2020/052575, mailed Jul. 21, 2020 (5 pages).
(Continued)

*Primary Examiner* — Terrell H Matthews
(74) *Attorney, Agent, or Firm* — NIXON PEABODY LLP; Jeffrey L. Costellia

(57) ABSTRACT

THIS invention relates to a process for the enhanced recovery of chromite and platinum group metals (PGMs) from a mixed chromite/PGM ore. Ore is ground 12, classified 14, to produce a coarse fraction and a fine fraction 36. The coarse fraction is subjected to gravity separation 16 and coarse particle flotation 20 to obtain a chrome concentrate and a PGM concentrate. The fine fraction 36 and PGM concentrate are ground 28, and subjected to conventional flotation 30 to obtain a PGM concentrate product 32. The benefits of this novel configuration of gravity concentration and coarse flotation technologies, as applied to both chromite and PGM recovery, are higher recoveries of chromite in a saleable
(Continued)

concentrate, higher recoveries of PGMs and base metals, and lower chromite content in the PGM concentrate.

10 Claims, 7 Drawing Sheets

(51) Int. Cl.
 *B07B 13/04* (2006.01)
 *C22B 11/00* (2006.01)
(52) U.S. Cl.
 CPC ...... *B03D 2201/04* (2013.01); *B03D 2203/02* (2013.01)
(58) Field of Classification Search
 USPC ........................................................ 209/165
 See application file for complete search history.

(56) References Cited

U.S. PATENT DOCUMENTS

| | | | | |
|---|---|---|---|---|
| 7,972,412 | B2* | 7/2011 | Bergeron | C22B 11/06 75/631 |
| 8,262,768 | B2* | 9/2012 | Gorain | C22B 3/04 75/744 |
| 2016/0310956 | A1* | 10/2016 | Filmer | C22B 15/0002 |
| 2018/0371578 | A1* | 12/2018 | Liddell | C22B 11/04 |

OTHER PUBLICATIONS

International Search Report for PCT/IB2020/052575, mailed Jul. 21, 2020 (4 pages).
International Preliminary Report for PCT/IB2020/052575, mailed Dec. 7, 2020 (14 pages).
C. J. Penberthy, et al., "The recovery of platinum-group elements from the UG-2 chromitite, Bushveld Complex—a mineralogical perspective", Mineralogy and Petrology (2000) 68, pp. 213-222.
J.D. Miller, et al., "Significance of Exposed Grain Surface Area in Coarse Particle Flotation of Low-Grade Gold Ore With the Hydrofloat™ Technology", (10 pages).
J.N. Kohmuench et al., "Improving coarse particle flotation using the HydroFloat™ (raising the trunk of the elephant curve)", Minerals Engineering, 121, (2018), pp. 137-145.
N.F. Dawson, "Experiences in the production of metallurgical and chemical grade UG2 chromite concentrates from PGM tailings streams", Journal Paper, The Journal of The Southern Africa Institute of Mining and Metallurgy, vol. 110, Nov. 2010, pp. 683-690.
Dawson, "Experiences in the production of metallurgical and chemical grade UG2 chromite concentrates from PGM tailings streams", The Journal of The Southern African Institute of Mining and Metallurgy, vol. 110, Nov. 2010, pp. 683-690.
Kohmuench et al., Improving coarse particle flotation using the HydroFloat™ (raising the trunk of the elephant curve), Minerals Engineering, Jun. 2018, vol. 121, (2018), pp. 137-145.
Miller et al., "Significance of Exposed Grain Surface Area in Coarse Particle Flotation of Low-Grade Gold Ore With the Hydrofloat™ Technology", IMPC 2016: XXVIII International Mineral Processing Congress Proceedings, Sep. 11-15, Quebec City, Canada (10 pages).
Penberthy et al., "The recovery of platinum-group elements from the UG-2 chromitite, Bushveld Complex—a mineralogical perspective", Mineralogy and Petrology, Mar. 2000, vol. 68, Issue 1-3, pp. 213-222.
International Search Report for PCT/IB2020/052575, mailed Jul. 21, 2020 (2 pages).
Notification of Transmittal of International Preliminary Report on Patentability (Chapter II of the Patent Cooperation Treaty), mailed Dec. 7, 2020 (14 pages).

* cited by examiner

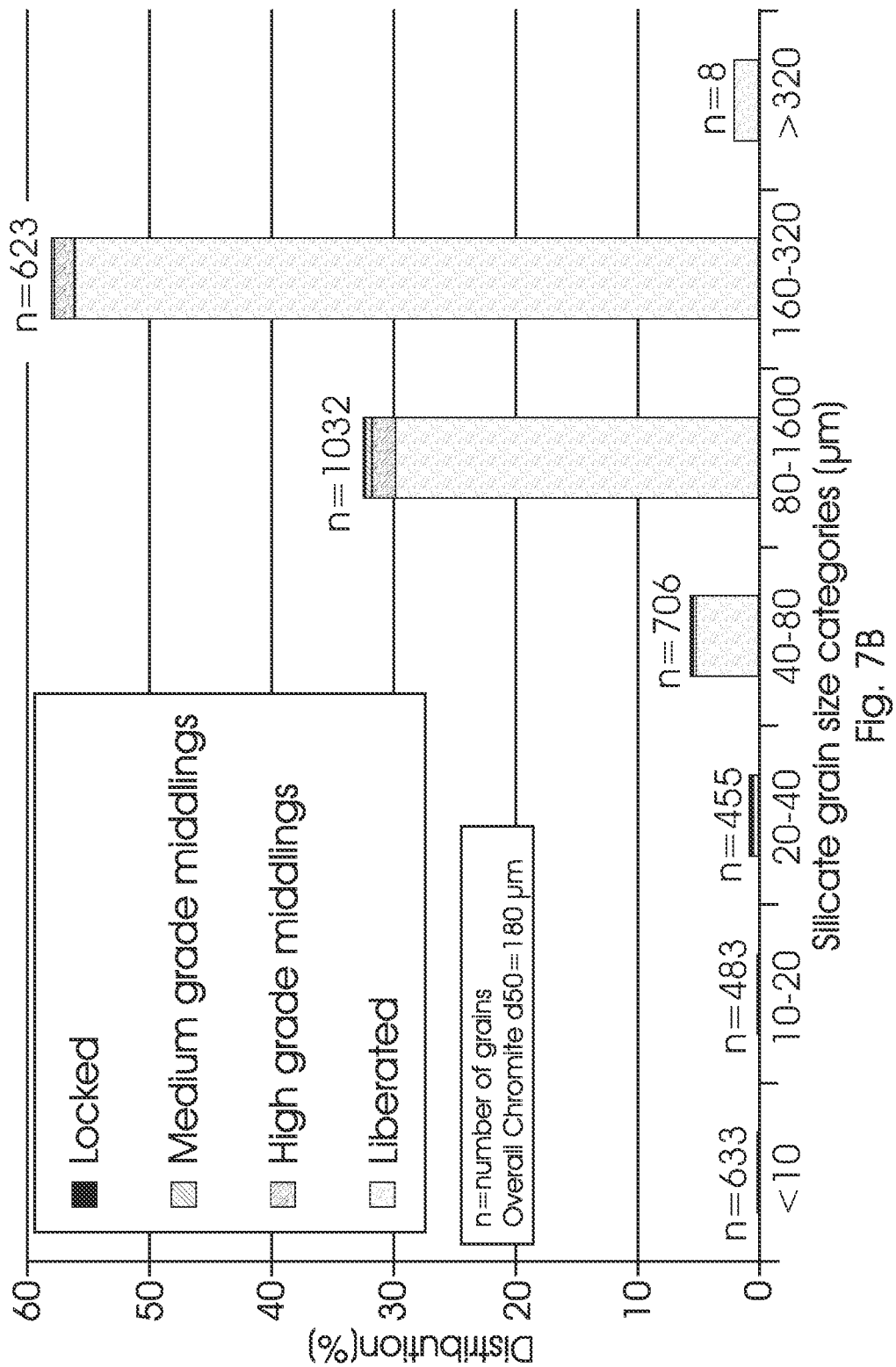

RECOVERY OF PGMS AND CHROMITE FROM MIXED PGM/CR ORES

BACKGROUND OF THE INVENTION

Many of the primary platinum group ores, such as those mined in Southern Africa, contain significant quantities of base metals and chromite. These ores must be milled to a fine grind size, typically a p80 less than 150 microns, to liberate the PGMs in a form suitable for flotation. This fine milling results in an ore from which gravity separation of by-product chromite is difficult, and where the PGM flotation concentrate contains significant quantities of entrained fine chromite, making the subsequent smelting problematic.

As described in Reference 1 the primary PGM industry has largely ignored the potential for chromite co-production, instead rejecting chromite as a gangue mineral. The chromite present in the PGM ore has been milled, along with the PGMs and other gangue, to the size suited for high recovery in conventional PGM flotation. PGMs and base metals are recovered and chromite reports to the flotation tailings.

The particle size distribution in the tailings is too fine for efficient gravity separation of by-product chromite. And due to the large quantities of chrome in the conventional flotation feed, the PGM flotation concentrate contains significant quantities of entrained fine chromite, making the subsequent smelting of the PGMs problematic.

In more recent times, several smaller businesses have reprocessed the finely milled PGM flotation tailings to separate the dense chromite from the other lighter gangue minerals using gravity separation technologies such as spirals. At less than 100 microns, the difference in in apparent density between very fine chromite and slightly coarser gangue becomes small. Chromium recoveries from both processes have been low, due to the small chromite particle size. Only the coarsest chromite particles can be recovered in a saleable concentrate, with recoveries typically around 10-20% of the potentially available chrome in the fine tailings.

Most recently, some primary PGM companies have sought to coarsen the grind size for separation of chromite, to a size at which the chromite is more efficiently recovered. The chromite is separated between the two stages of milling and conventional flotation of PGMs. The first stage of milling yields a p80 of around 100-150 microns from which around 65% of the PGMs are recovered by conventional flotation. This leaves a slightly coarser chromite in the PGM depleted primary flotation residue, enabling slightly more efficient gravity separation of the chromite. Recoveries are typically around 25% of the chromite present in the ore. By conducting the gravity separation after primary flotation, the potential for misplacing PGMs into the chrome concentrate is reduced but not eliminated. High overall PGM recovery is assured by further grinding the chromite recovery tails, for efficient PGM liberation and conventional flotation recovery.

In addition to the PGM resources that contain some chromite, there are also chromium resources which contain some PGMs as a by-product. Examples are the primary chromite ores found in the middle and lower reefs of the Witwatersrand basin, and elsewhere around the world, can contain by-product quantities of PGMs and base metals.

These ores are milled to an ideal size for chromite separation using methods such as spirals, hydraulic classifiers and tables. Similar to the inter-stage recovery described above, the PGMs and base metals are conventionally floated at quite a coarse grind size to form a saleable PGM concentrate and then a chromite recovery is produced from the flotation residue by gravity separation. The grade of PGMs remaining in the residue from gravity separation is typically too low to consider further fine grinding and conventional flotation.

Grinding of the primary chrome ore to an ideal size for gravity separation, results in higher percentage losses of PGMs and base metals into the chromite product (either attached to the chromite or have an equivalent apparent density to chromite), than would have occurred if the ore was more fully liberated.

Operations such as Tharisa Mine in South Africa process this primary chrome ore with minor PGM and base metal content. Tharisa screens the run-of-mine ore for primary gravity separation at a coarse grind size where spirals recovery of chromite is efficient. This is followed by further milling, PGM conventional flotation and then secondary gravity separation. The global chrome recovery is over 60% chrome recovery. However, at the initial coarse grind size, losses of PGMs into the chromite product are significant. For the Tharisa flowsheet, whilst these PGM losses are undesirable, the value of the extra chromite recovery at the larger grind size outweighs the consequential losses of PGMs.

It is an object of this invention to provide a process for enhanced recovery of chromite and PGMs from a mixed chromite/PGM ore.

SUMMARY OF THE INVENTION

According to the present invention there is provided a process for the enhanced recovery of chromite and platinum group metals (PGMs) from a mixed chromite/PGM ore by:
a) grinding the ore to a p80 grind size in the range of 0.15 to 1.5 mm suitable for coarse particle flotation, wherein chromite is liberated and where PGMs are at least partially exposed;
b) classifying the ground ore into a coarser fraction with a particle size from 100 μm to 150 μm or greater, typically 150 μm or greater, suitable to gravity separation and coarse flotation, and a finer fraction with a particle size less than 100 μm to 150 μm, typically less than 150 μm, suitable for conventional flotation;
c) subjecting the coarser fraction to gravity separation and coarse particle flotation thereby to obtain a chromite concentrate and a coarse particle flotation PGM concentrate (the gravity separation may take place before the coarse particle flotation, or alternatively the coarse particle flotation may take place before the gravity separation);
d) subjecting the coarse particle flotation PGM concentrate from step c) and possibly a lighter fraction from the gravity separation at step c) to fine grinding to obtain a finely ground stream with a particle size of less than 150 μm; and
e) subjecting the finely ground stream from step d) to conventional flotation to produce a PGM concentrate product.

PGMs are the platinum group metals and include ruthenium, rhodium, palladium, osmium, iridium, and platinum.

The ore may be a primary PGM ore containing by-product chromium, or the ore may be a primary chrome ore containing by-product PGMs.

Preferably, the p80 grind size of step a) is in the size range of 0.2-1 mm, more preferably 0.2-0.6 mm, more preferably in the size range of 0.25-0.5 mm.

Typically, the grinding equipment at step a) is operated to generate a product size distribution containing less than 30%<75 μm, preferably containing less than 20%<75 μm.

The grinding equipment at step a) may be VSI, EDS, or Vero Liberator to provide a sharper size distribution.

The ground ore is classified at step b) may have a particle size greater than 100 μm or greater than 150 μm, up to 800 μm, or up to 500 μm, typically up to 400 μm or 350 μm.

At step d) the PGM concentrate and possibly the lighter fraction from the gravity separation may be finely ground to obtain a finely ground stream with a particle size less than 100 μm.

In a first embodiment of the invention, coarse particle flotation is applied to the chrome concentrate after gravity concentration, wherein:
- at step c), the classified ore from step b), is subjected to gravity separation to provide a chrome concentrate and a gravity separation lighter stream; and the chrome concentrate is subjected to coarse particle flotation to provide the coarse particle flotation PGM concentrate and a chrome product;
- at step d) the gravity separation tailings stream and the coarse particle flotation PGM concentrate are subjected to fine grinding to provide the finely ground stream; and
- at step e) the finely ground stream is subjected to conventional flotation to produce the PGM concentrate.

In a second embodiment of the invention, coarse particle flotation is applied to the ore prior to gravity concentration, wherein
- at step c), the classified ore from step b), is subjected to coarse particle flotation to provide a coarse particle flotation PGM concentrate and a coarse particle flotation tailings stream; and the coarse particle flotation tailings stream is subjected to gravity separation to provide a chrome concentrate and a gravity separation tailings stream;
- at step d) the coarse particle flotation PGM concentrate and and possibly the gravity separation tailings stream are subjected to fine grinding to provide the finely ground stream; and
- at step e) the finely ground stream is subjected to conventional flotation to produce the PGM concentrate product.

BRIEF DESCRIPTION OF THE DRAWINGS

FIG. 7B is a graph showing the liberation of silicates at various particle sizes;

DESCRIPTION OF PREFERRED EMBODIMENTS

The present invention relates to a process for the enhanced recovery of chromite and PGMs from a mixed chromite/PGM ore. As such it is important to understand the mineral deportment between the phases of the ore.

Mineralogy of the PGM/Chromite Ores

PGM mineral grains are not typically found within the chromite mineral lattice, in mixed chromite/PGM ores (Reference 2—Penbathy). Rather, the PGMs exist as sulphides, arsenides and metallic form as discrete mineral grains which are attached to the adjacent chromite or silicate gangue mineral grains or attached to or incorporated in the base metal sulphide grains.

When grinding the ore to liberate the minerals for subsequent conventional beneficiation, it is essential to grind to a size at where liberation of chromite from the silicate gangue has occurred, to allow the production of a suitably pure chromite concentrate.

From a chromium recovery perspective, the ideal grind size for gravity separation of chromite is above around 150 microns, where the apparent density of the chromite particles is sufficiently different from the remaining gangue for a high recovery in a gravity separation.

The upper size limit for chrome recovery will be dependent on the liberation characteristics of the ore. Almost quantitative liberation is required to achieve a satisfactory chrome product grade. This typically occurs at sizes less than a p80 of around 400 microns, where gravity separation is efficient. But, with the particle size distributions (PSD) inherent in any grinding and classification, some PGMs and base metals will still be attached to the chromite in the coarser particles. If these composites contain mostly chromite, they will report to the chromite concentrate in gravity separation.

The PGM minerals are generally of a higher real density than chromite, albeit finer grained. And the density of the base metal sulphides containing PGMs are between chromite and gangue. Hence, in any particle size distribution, the larger grains of PGMs and base metal sulphides will have an apparent density similar to the finer chromite, complicating efficient gravity separation.

Particularly for ores where PGMs represent a significant proportion of revenue, this potential loss of PGMs to the chromite product is problematic. It is not possible to separate the misplaced PGMs from the chromite gravity separation feed or the chromite product using the conventional flotation technology, as conventional flotation recoveries of PGMs and base metals are low at grain sizes above 150 microns.

So, selecting a coarse grind results in high chromite recovery but with unacceptable PGM losses to the chromite product. Selecting a fine grind results in satisfactory pgm recovery but with high chromite losses.

Figure 1:
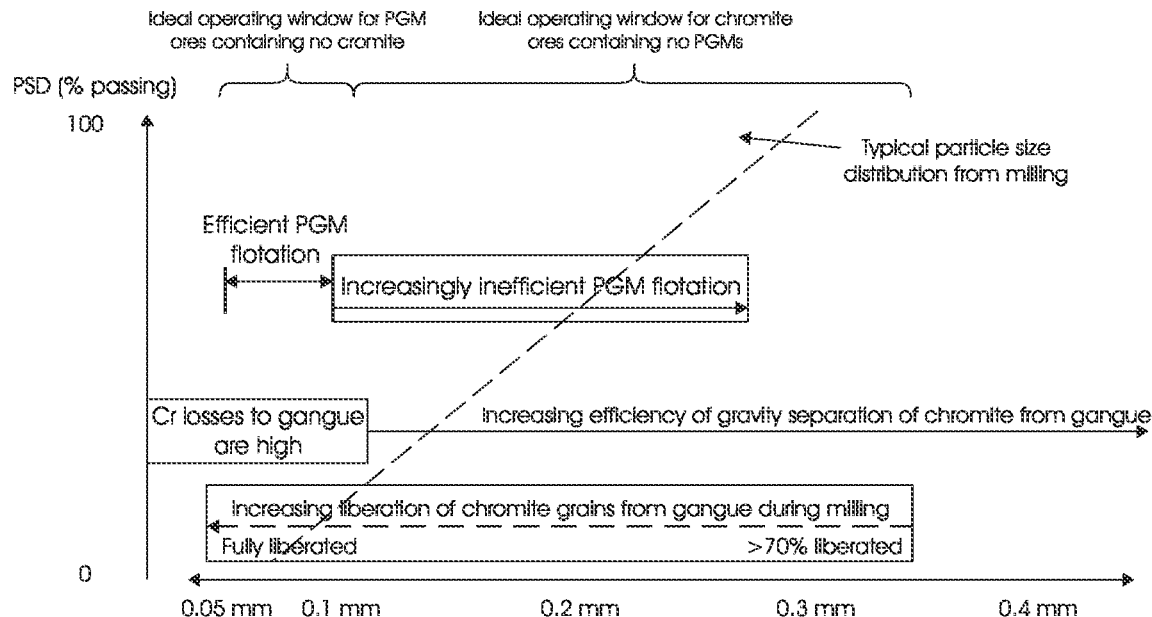
FIG. 1 is a schematic demonstrating the size/recovery principle underpinning conventional processing.

This trade-off with conventional processing technology is shown schematically in FIG. 1.

Efficient conventional flotation of PGMs operates at less than 150 microns, whilst efficient gravity separation of chromite is at a size above 150 microns. The ore can be ground to a size distribution around that for its optimum value recovery, but the size distribution of any ground and classified ore feed implies losses of both fine chrome and coarse PGMs will occur.

The invention utilises a beneficiation technology that enables an efficient recovery of most of the PGMs and base metals at a coarser grind size, in a beneficiation system that ideally fits the liberation and gravity separation characteristics of the combined PGM chrome ore.

This beneficiation system operates with a significant overlap in acceptable size ranges for both efficient gravity recovery of chromite and efficient recovery of PGMs. This overlap enables enhanced recovery of both chrome and PGMs at the grind size selected to best fit the ore.

The beneficiation technologies that form part of the beneficiation system are coarse particle flotation, gravity separation and conventional flotation.

Coarse Particle Flotation

Coarse flotation may take place using a fit for purpose flotation machine such as the Eriez™ Hydrofloat. The Eriez Hydrofloat™, carries out the concentration process based on a combination of fluidization and flotation using fluidization water which has been aerated with micro-bubbles of air. The flotation is carried out using a suitable activator and collector concentrations and residence time, for the particular mineral to be floated. At this size, the ore is sufficiently ground to liberate most of the non-floating product (chrome) and expose but not necessarily fully liberate the valuable base metals and PGM mineral grains in the fraction that is floated. The coarse flotation recoveries of partially exposed mineralisation is high, and the residual fraction forms a sand which does not warrant further comminution and conventional flotation.

Gravity Separation of the Chromite

Gravity separation utilises the difference in apparent density of particles to separate the less dense or lighter silicates from the denser or heavier chrome material. For chromite, this gravity separation is usually performed using spirals, but could equally be undertaken with other gravity separation devices such as a hydraulic classifier, or jig, or dense media separation.

Conventional Flotation

In a conventional froth flotation process, particle sizes are typically less than 0.15 mm (150 µm). The ore particles are mixed with water to form a slurry and the desired mineral is rendered hydrophobic by the addition of a surfactant or collector chemical. The particular chemical depends on the nature of the mineral to be recovered. This slurry of hydrophobic particles and hydrophilic particles is then introduced to tanks known as flotation cells that are aerated to produce bubbles. The hydrophobic particles attach to the air bubbles, which rise to the surface, forming a froth. The froth is removed from the cell, producing a concentrate of the target mineral, in this case PGMs and base metals. Frothing agents, known as frothers, may be introduced to the slurry to promote the formation of a stable froth on top of the flotation cell. The minerals that do not float into the froth are referred to as the flotation tailings or flotation tails. These tailings may also be subjected to further stages of flotation to recover the valuable particles that did not float the first time. This is known as scavenging.

Relative to conventional flotation, coarse particle flotation increases the size at which efficient recovery of PGMs and base metals can be achieved. Coarse particle flotation is undertaken in a supported teeter bed, and without a froth layer, to increase the buoyancy of larger and composite particles of the mineral species to which the injected bubbles attach.

Figure 2:
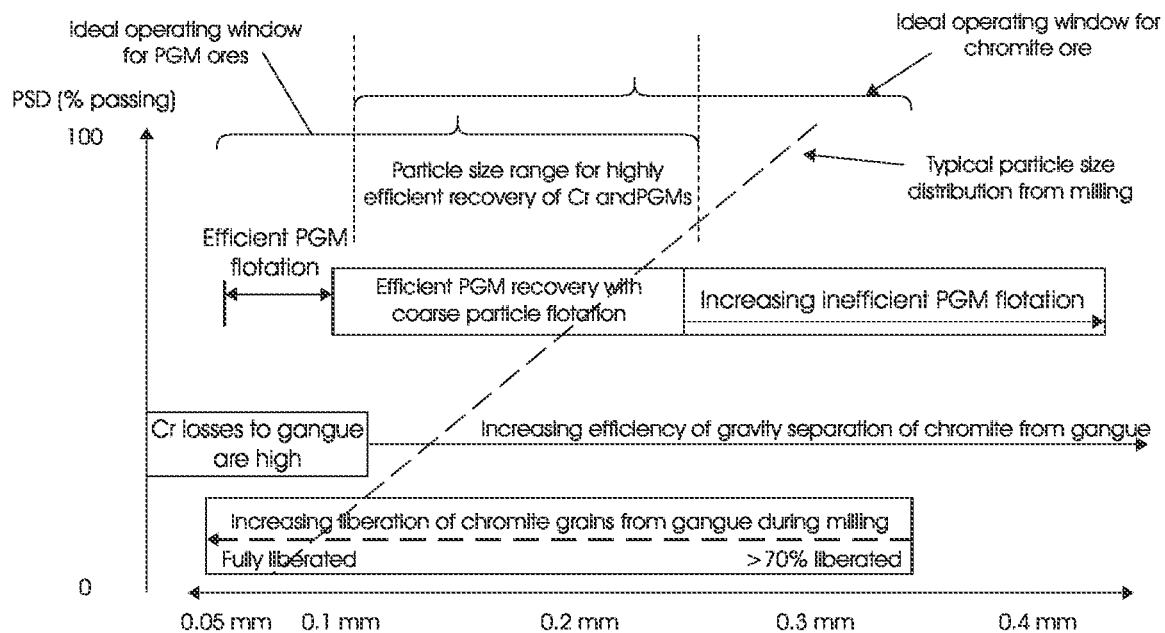
FIG. 2 is a schematic demonstrating the size/recovery principle underpinning underpinning the present invention.

Coarse particle flotation can achieve a high PGM extraction up to around 250 microns, and moderately efficient extraction of PGM composite particles up to 500 micron. This creates an overlap in particle size range in which both chromite and PGMs can be separated from the silicate gangue. i.e. in the size range from 150 to 250 microns, extensive liberation of chromite exists, and efficient gravity separation of the chromite is possible, and efficient PGM recovery is possible. See FIG. 2.

Even on the shoulders of this particle size range, separations of both chromite and PGMs are reasonably efficient.

Coarse particle flotation has previously been recognised as capable of floating sulphides (reference 4) but has not been previously been considered in the context of a beneficiation system for selective recovery of ores which contain both chromite and PGMs.

The first step in the overall system that represents this invention is grinding and classifying the ore to an ideal particle size for both PGM recovery through coarse particle flotation; and chromite recovery and with sufficient liberation to yield a saleable chromite concentrate. When grinding and classifying the ore, it is advantageous to tighten the particle size distribution (PSD) around the optimum particle size p80 where gravity separation of chromite is efficient. The PSD may be limited to a size range of 0.2-0.6 mm, more in the size range of 0.25-0.5 mm, and the grinding equipment is operated to generate a product size distribution containing less than 30%<75 µm, preferably containing less than 20%<75 µm.

This grind size and tight PSD avoids excessive formation of fine chrome particles (low apparent density) which would not be recoverable in the gravity separation.

This tighter PSD can be achieved through selection of appropriate grinding and classification equipment, as is known to those skilled in the art. For example, a cone crusher, or vertical shaft impactor VSI, or Vero Liberator (described in US2016228879, the content of which is incorporated herein by reference), or an Energy Densification System (EDS) mill have all been found to yield tighter particle size distributions than semi-autogenous grinding (SAG) or ball mills. The tight PSD avoids excessive formation of fine chrome particles which are difficult to recover in the gravity separation due to their low apparent density, and large composite grains from which recovery of PGMs will be less efficient.

Figure 3:
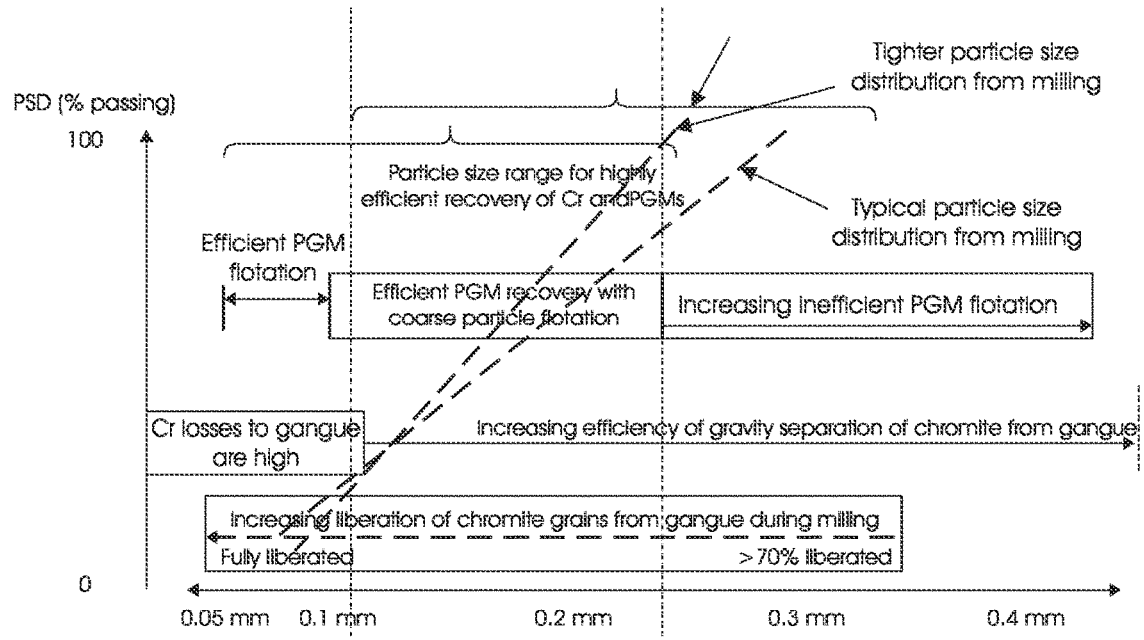
FIG. 3 is a schematic demonstrating the impact of achieving a tight particle size distribution during milling and classification.

This impact of PSD is illustrated schematically in FIG. 3, where a greater proportion of the feed to gravity separation is present in the size range for optimum recovery of both chromite and PGMs.

Depending on the specific ore, the preferred flowsheet of the beneficiation system may recover either PGMs or chromite first, with the other valuable mineral being recovered from the residual fraction of the initial recovery.

This optionality provides flexibility to adapt the current invention into multiple flowsheet embodiments.

Figure 4:
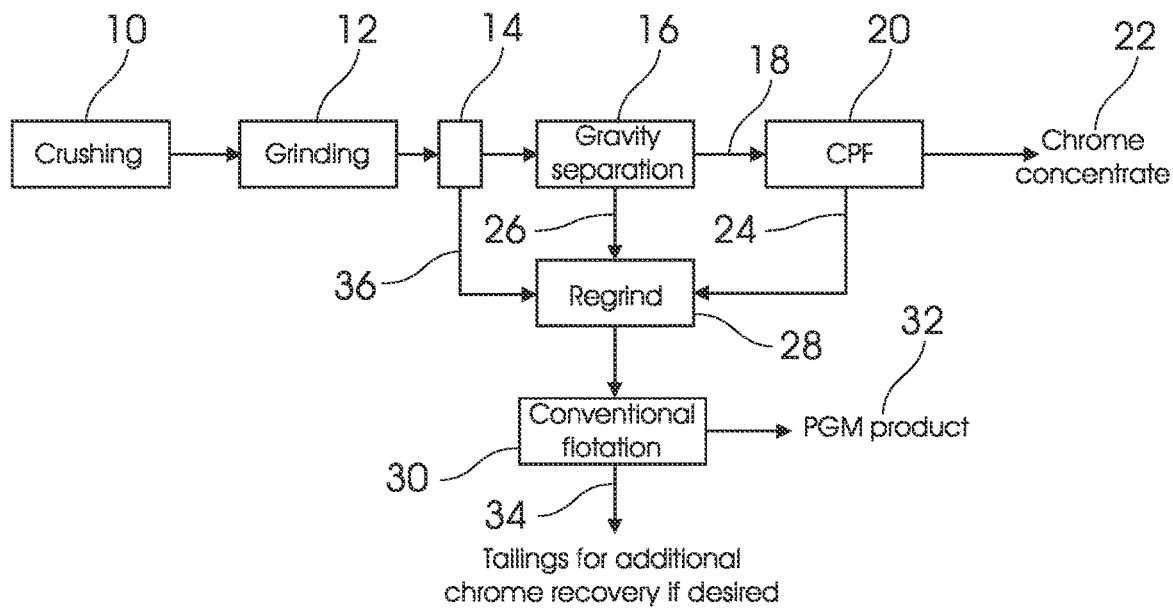
FIG. 4 is a flow diagram of a process according to a first embodiment of the invention.

With reference to FIG. 4, for the embodiment in which the chromite will be recovered first, the first step in the overall system is crushing 10, grinding 12 and classifying 14 ore to an ideal particle size for production of chromite. The grind size is selected to provide adequate chromite liberation to yield a saleable chromite concentrate. Typically, the optimum p80 will be in the range between 0.2 to 1 mm depending on ore characteristics, and most typically around 0.4 mm, and the classifier 14 separates a coarse fraction with a particle size greater than 150 µm and is a suitably sized feed for gravity separation, from a fine fraction with a particle size less than 150 µm.

After preparation of a suitably sized feed, chromite is recovered through a gravity separation device 16 such as spirals, or a hydraulic classifiers or a shaking table. Whilst most of the fine PGMs and base metals will report to the less dense silicate fraction in gravity separation, a commercially significant fraction will report to the chromite concentrate. The chromite concentrate 18 is of a suitable size (greater than 150 µm) for direct feed to coarse particle flotation 20. The coarse particle flotation 20 scavenges the PGMs and base metals that have been misplaced into the coarse chromite.

The coarse particle flotation 20 produces a chrome concentrate 22, and PGM concentrate 24 that is mixed with the gravity separation reject 26, for regrinding 28 to an ideal size (below 100 µm) and subjected to conventional PGM flotation 30 to produce a PGM product 32 and tailings 34 for disposal or additional chrome recovery if desired. A sorted fine fraction 36 with particle size less than 150 µm from the classifier 14 may be reground 28 and supplied to the conventional flotation 30.

Figure 5:
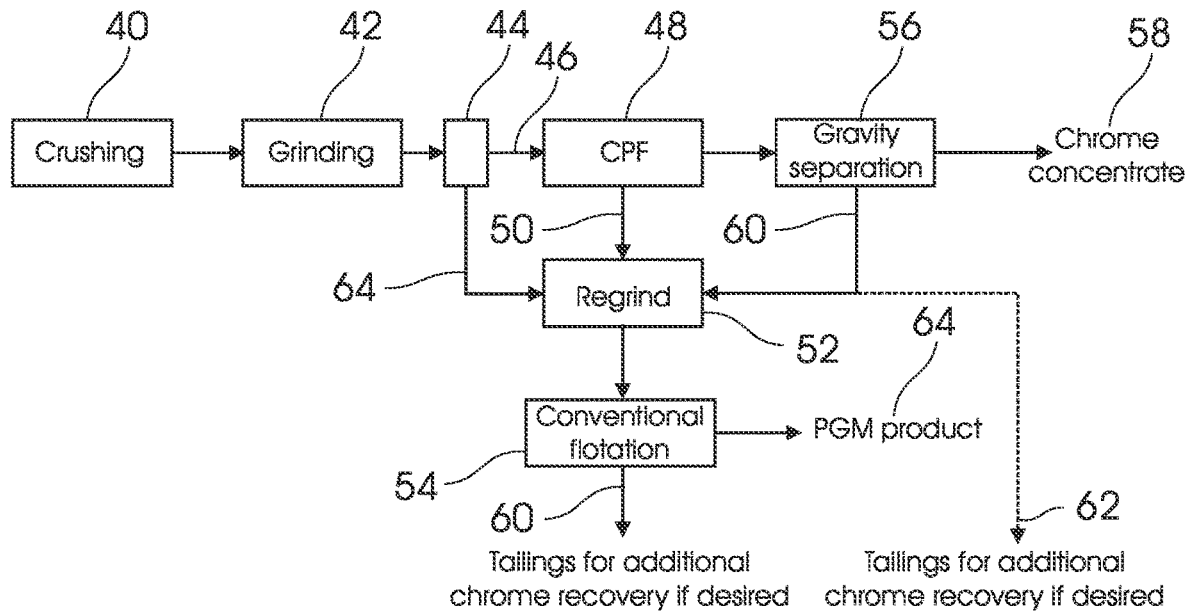
FIG. 5 is a flow diagram of a process according to a first embodiment of the invention.

FIG. 5 illustrates a second embodiment of the invention utilising coarse particle flotation prior to gravity separation. In this second embodiment the ore is crushed 40 and ground 42 to a similar feed size as that for the first embodiment. The ore is classified 44 to generate a suitable feed 46 (particle size greater than 150 µm) for PGM and base metal recovery using coarse particle flotation 48. The coarse particle flotation concentrate 50 is mixed with the undersize 64 from classification 44 and reground 52 to a size suitable for conventional flotation 54. The coarse particle flotation 48 reduces the PGM content in the feed to the gravity separation 56 and hence reduces the potential for misplacement of PGMs into the chromite gravity concentrate 58.

The undersize 64 from the classification 44 may be processed through a gravity circuit to recover some of the chromite, prior to being ground to the ideal size for conventional flotation 54. Reject 60 from the gravity separation 56 may be mixed with the coarse particle flotation concentrate 50 and reground 52 to a size suitable for conventional flotation 54 (below 100 µm). For some ores, the reject 60 from gravity separation 56, depending on the deportment of chromite by size and the coarse flotation efficiency, may not warrant further processing for either PGM or chromite recovery, and be assigned directly to tailings storage 62. The conventional flotation 54 produces a PGM product 64 and tailings 66 for additional chrome recovery if desired.

For both embodiments of the invention, an additional benefit to enhanced chrome recovery is the impact on PGM recoveries and PGM concentrate grades. By removing much of the chromite prior to conventional flotation, the concentration of PGM and base metals in the ore feeding conventional flotation is increased and chromite content reduced. Thus, the potential for accidental entrainment of PGMs with gangue in the conventional flotation is significantly reduced.

And the potential for accidental entrainment of fine chromite in the PGM concentrate is also reduced for similar reasons. This lower chromite content in the PGM concentrate can affect the downstream smelting of the PGM concentrate.

And finally, the coarser chromite product made possible by this invention is ideally suited to specific applications such as use as a foundry sand.

Figure 6:
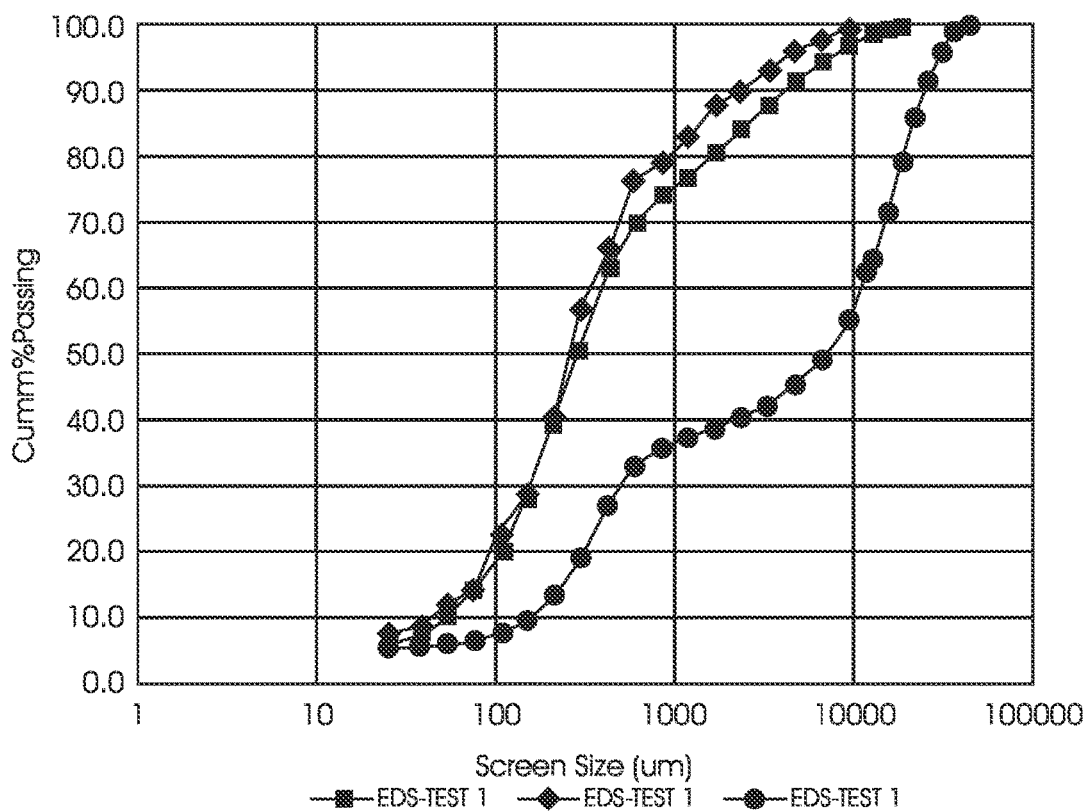
FIG. 6 is a graph showing the size distribution after grinding of a sample of UG2 ore, using an EDS mill.

In summary, the benefits of this novel configuration of gravity concentration and coarse flotation technologies, as applied to both chromite and PGM recovery, are
  Higher recoveries of chromite in a saleable concentrate
  Higher recoveries of PGMs and Base Metals
  Lower chromite content in the PGM concentrate Examples A sample of PGM ore from the UG2 seam was milled using an EDS mill. The particle size distribution is shown in FIG. 6. From the milled product, a sample of the 100-300 micron material was separated for mineralogy analysis and then laboratory testing of chromite separation using a shaking table.

Figure 7A:
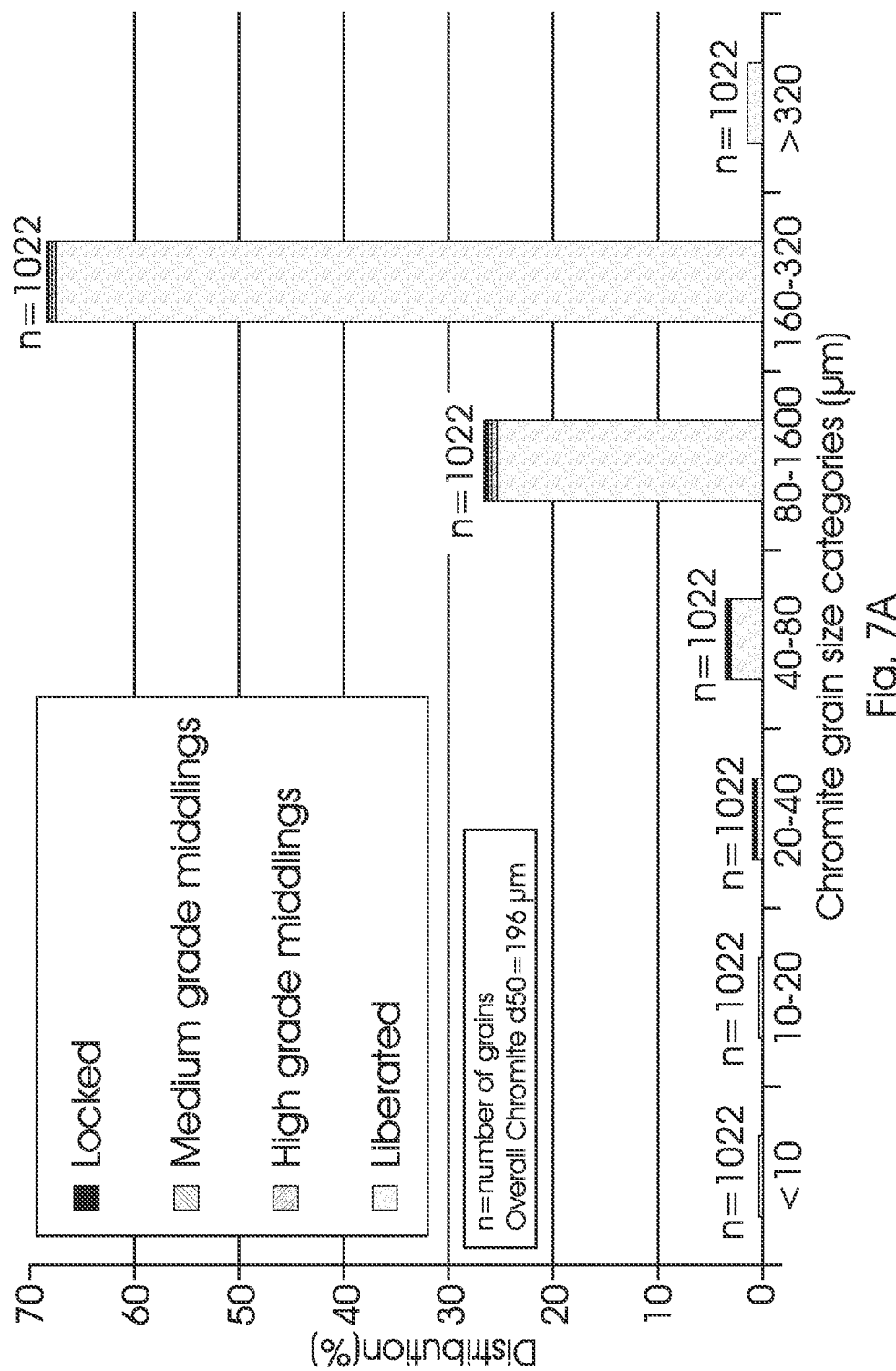
FIG. 7A is a graph showing the liberation of chromite at various particle sizes.
Figure 8:
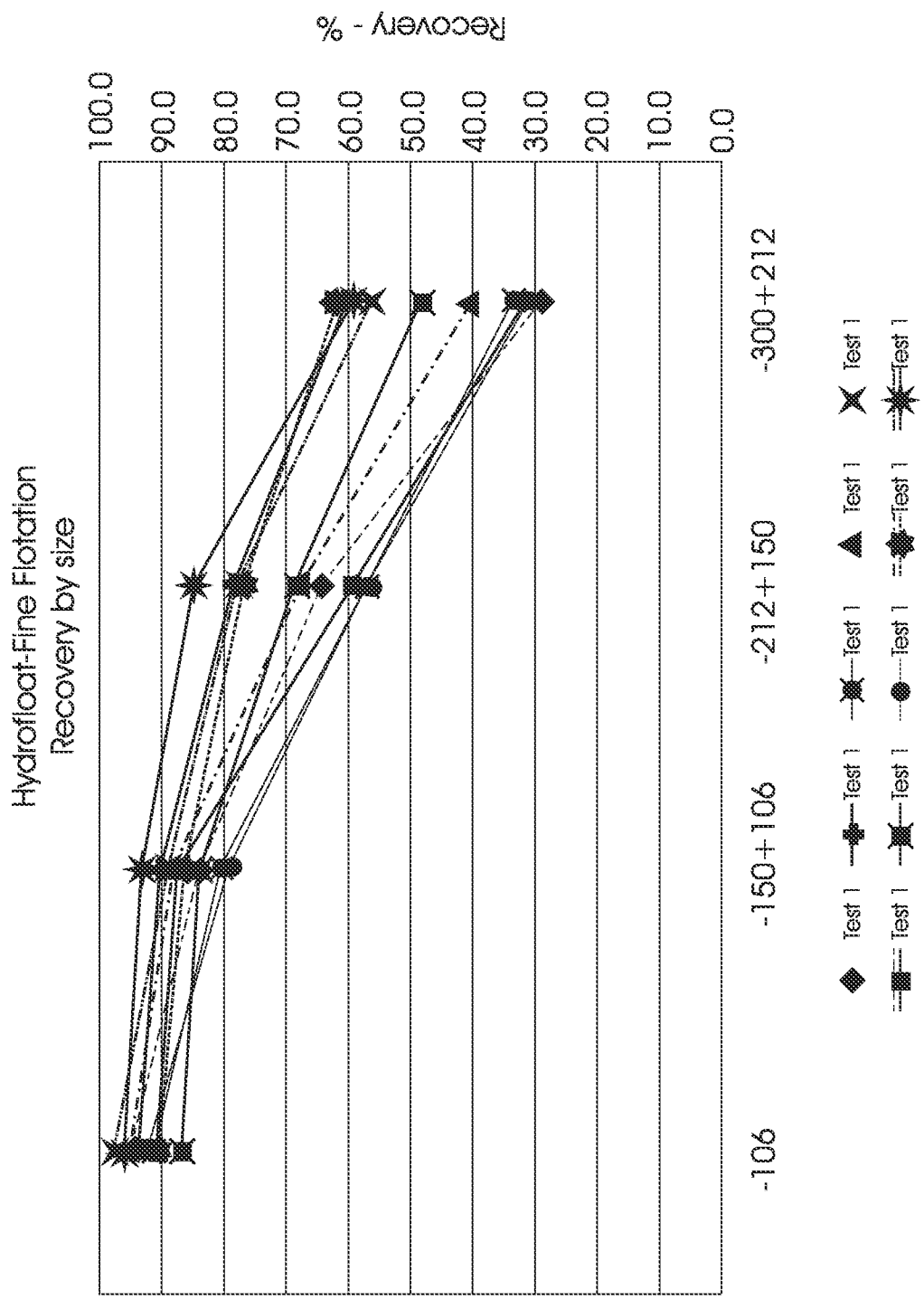
FIG. 8 is a graph of PGM recovery using coarse particle flotation.

The chromite and silicate liberation at different particle sizes, are illustrated in FIGS. 7A and 7B.

Almost 100% liberation of both the chromite and silicate components is evident up to 300 microns.

Subsequent work has illustrated almost complete liberation of chromite up to 700 microns for some ores, thus increasing the size range over which the invention can apply.

This high degree of liberation implies that effective gravity separation of chromite from the bulk gangue is possible throughout the size range where apparent densities enable good extraction of chromite (100-400 microns) and where liberation of chromite remains almost quantitative.

The efficient gravity separation on the 100-300 microns fraction, is shown in Table 1, where almost 60% of the chromium reports to a concentrate averaging over 40% $Cr_2O_3$.

TABLE 1

| | EDS-TEST 1 ~70 TPH | | | | | |
|---|---|---|---|---|---|---|
| Stream | Mass (%) | Cum. Mass (%) | Grade $Cr_2O_3$ % | Cum. Grade $Cr_2O_3$ % | Recovery $Cr_2O_3$ % | Cum. Recovery $Cr_2O_3$ % |
| Conc 1 | 2.24 | 2.24 | 44.30 | 44.30 | 2.97 | 2.97 |
| Conc 2 | 3.14 | 5.38 | 43.10 | 43.60 | 4.05 | 7.02 |
| Conc 3 | 4.7 | 10.08 | 44.60 | 44.07 | 6.27 | 13.29 |
| Conc 4 | 6.1 | 16.18 | 43.00 | 43.66 | 7.85 | 21.14 |
| Midds 1 | 14.9 | 31.08 | 40.60 | 42.20 | 18.10 | 39.24 |
| Midds 2 | 15.1 | 46.18 | 39.10 | 41.18 | 17.67 | 56.91 |
| Tails 1 | 27.1 | 73.28 | 34.30 | 38.64 | 27.82 | 84.73 |
| Tails 2 | 26.72 | 100 | 19.10 | 33.42 | 15.27 | 100.00 |
| Total | 100.0 | | 33.42 | | 100.00 | |
| Head grade | | | 33.90 | | | |

Furthermore, without prior coarse particle flotation, around 10% of the PGMs and base metals reported to the chromite product. This 10% partition of PGMs demonstrates the need for coarse particle flotation to reduce the PGM losses.

A mineralogical analysis of the chromite product shows the PGM loss into chromite product to be due mostly to liberated PGMs and PGMs attached to base metal sulphides. Both these mineral forms are potentially floatable either before or after gravity separation of the chromite.

During grinding, the PGMs tend to concentrate in the finer grind sizes, particularly less than 100 microns, which are assigned directly to conventional flotation. The resulting head grade for gravity separation in the 100-400 microns fraction is typically around 40% of the average head grade of the total ore.

Coarse particle flotation tests on a different samples of PGM ores, prior to chromite separation, demonstrates average PGM recoveries from the 100-300 microns fraction of around 80%-90% from the RoM ore.

PGM recoveries using coarse particle flotation are comparable to the recoveries in the first and second stages of conventional flotation undertaken at a p80 of around 150 microns (around 65%). Thus for some ores where PGM liberation is high, the residue from coarse particle flotation may not warrant further PGM recovery.

Independent of whether recovery of PGMs is undertaken by coarse particle flotation on the ore prior to gravity separation, or from the chromite concentrate after gravity separation, one can anticipate PGM losses to the chromite product to be low. The gravity upgrading step is moderately efficient in separating the PGMs from chromite, and when complemented with coarse flotation the combined separation is very effective.

Figure 9:
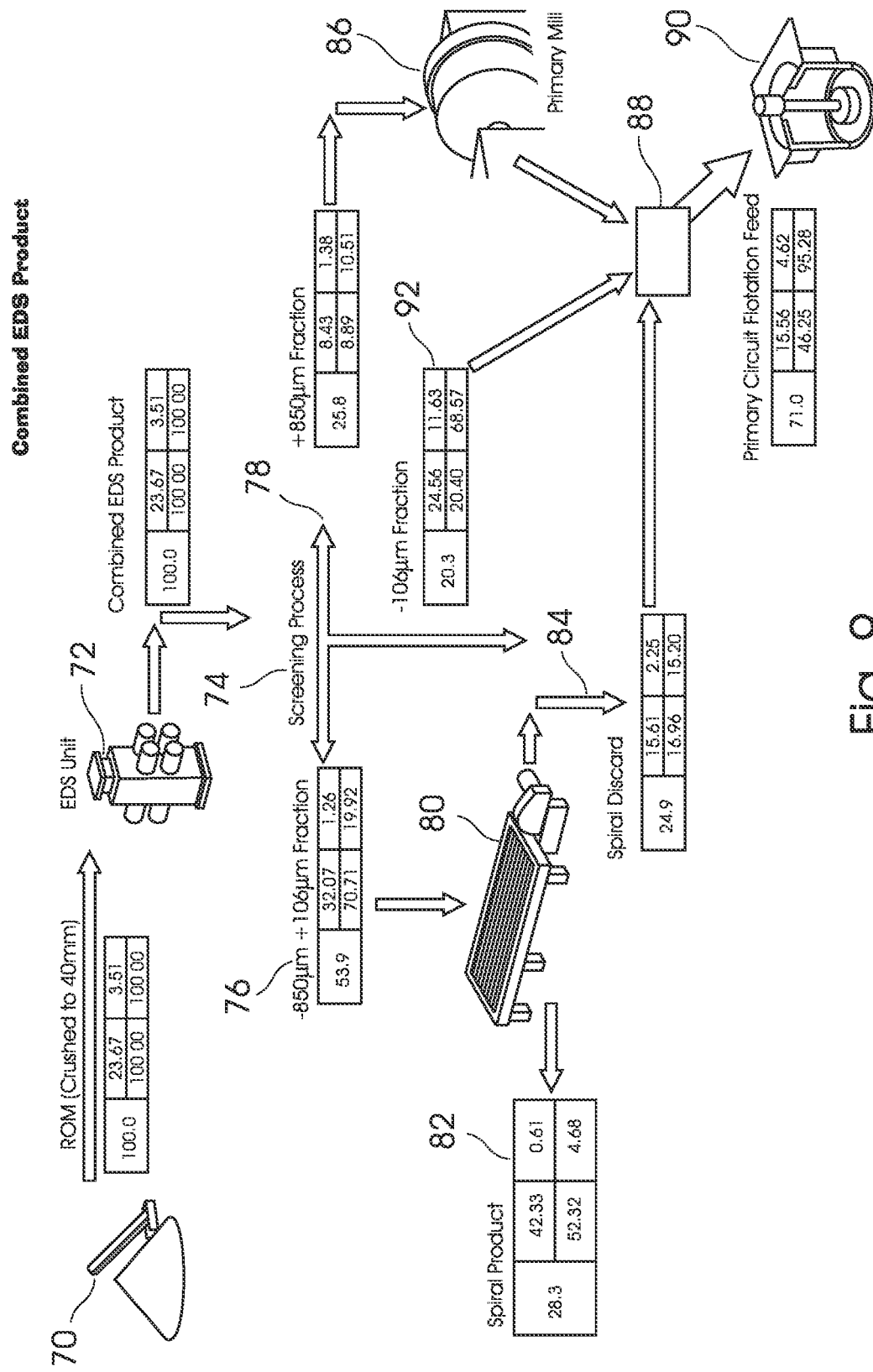
FIG. 9 shows the modelling of a gravity circuit based on experimental data obtained from a PGM ore with by-product chromium.

FIG. 9 shows the modelling of a gravity circuit based on experimental data obtained from a PGM ore with by-product chromium. This test was designed to test the upper separation size possible for efficient chrome and PGM recovery, through CPF PGM scavenging from the chromite product. ROM ore 70 is crushed to 40 mm and ground in an EDS unit 72. The ground ore is screened 74 to provide a −850 μm to +106 μm fraction 76 and a +850 μm fraction 78. The fraction 76 is supplied to a Spiral Gravity Separation Unit 80 an provides a chrome concentrate 82 and a reject containing most of the PGMs 84. The fraction 78 is ground in a mill 86 to an ideal size for PGM flotation, and the ground fraction 88, discard 84 and a −106 μm fraction 92 from the screen 74 are subjected to coarse particle flotation 90.

The size selected gravity separation was between 106-850 microns, and 28% of the original ore mass reports to a 42% Cr2O3 chromite gravity concentrate. This chrome gravity concentrate contains only 0.6 gpt 2E PGMs. Mineralogy analysis indicated that most of these PGMs are in the finer fractions and are liberated from the chromite, and hence are readily recoverable by coarse flotation. Subsequent CPF testing showed a 60% PGM recovery from this chromite product, implying that around 97% of the PGMs in the original RoM report ultimately to PGM flotation in around 75% of the original RoM mass.

The lower throughput for PGM recovery allows for finer grinding, and the enhanced PGM feed grade to flotation, hence the conventional float recovery for PGMs will be enhanced, relative to current procedures.

Reference 1: Experiences in the production of metallurgical and chemical grade UG2 chromite concentrates from PGM tailings streams, N. F. Dawson, The Journal of The Southern African Institute of Mining and Metallurgy, Volume 10, November 2010, pg 683-690.

Reference 2: Penberthy et. al. Mineralogy and Petrology March 2000, Volume 68, Issue 1-3, pp 213-22

Reference 3: Mankosa et. al. June 2018, Minerals Engineering 121:137-145

Reference 4: Miller et. al. Significance of Exposed Grain Surface Area IMPC 2016: XXVIII International Mineral Processing Congress Proceedings, September 11-15, Quebec City, Canada

The invention claimed is:

1. A process for the enhanced recovery of chromite and platinum group metals (PGMs) from a mixed chromite/PGM ore by:
 a) grinding the ore to a particle size distribution p80 in the range of 0.2 to 0.6 mm containing less than 30%<75 μm;
 b) classifying the ground ore into a coarser fraction with a particle size from 100 μm to 150 μm or greater, and a finer fraction with a particle size less than 100 μm to 150 μm;
 c) subjecting the coarser fraction to gravity separation and coarse particle flotation thereby to obtain a chromite concentrate and a coarse particle flotation PGM concentrate;
 d) subjecting the coarse particle flotation PGM concentrate to fine grinding to obtain a finely ground stream with a particle size of less than 150 μm; and
 e) subjecting the finely ground stream from step d) to conventional flotation to produce a PGM concentrate product.

2. The process claimed in claim 1, wherein the p80 grind size of step a) is in the size range of 0.25-0.5 mm.

3. The process claimed in claim 1, wherein grinding equipment at step a) is operated to generate a product size distribution of containing less than 20%<75 μm.

4. The process claimed in claim 1, wherein the grinding equipment at step a) is a VSI, EDS, or Vero Liberator.

5. The process claimed in claim 1, wherein the coarser fraction at step b) has a particle size from 150 μm or greater suitable to gravity separation and coarse flotation, and the finer fraction has particle size less than 150 μm.

6. The process claimed in claim 1, wherein at step d) the coarse particle flotation PGM concentrate are finely ground to obtain a finely ground stream with a particle size less than 100 μm.

7. The process claimed in claim 1, wherein at step b) coarse particle flotation is applied after gravity concentration.

8. The process claimed in claim 7, wherein:
 at step c), the classified ore from step b), is subjected to gravity separation to provide the chrome concentrate and a gravity separation lighter stream; and the chrome concentrate is subjected to coarse particle flotation to provide the coarse particle flotation PGM concentrate and a chrome product;
 at step d) the gravity separation tailings stream and the coarse particle flotation PGM concentrate are subjected to fine grinding to provide the finely ground stream; and
 at step e) the finely ground stream is subjected to conventional flotation to produce the PGM concentrate product.

9. The process claimed in claim 1, wherein at step b) coarse particle flotation is applied prior to gravity concentration.

10. The process claimed in claim 9, wherein
 at step c), the classified ore from step b), is subjected to coarse particle flotation to provide the coarse particle flotation PGM concentrate and a coarse particle flotation tailings stream; and the coarse particle flotation tailings stream is subjected to gravity separation to provide the chrome concentrate and a gravity separation tailings stream;
 at step d) the coarse particle flotation PGM concentrate and the gravity separation tailings stream are subjected to fine grinding to provide the finely ground stream; and
 at step e) the finely ground stream is subjected to conventional flotation to produce the PGM concentrate.

* * * * *